UNITED STATES PATENT OFFICE.

JACOB A. SCHMITT AND CHARLES R. BELL, OF CHICAGO, ILLINOIS.

COMPOSITION OF MATTER.

955,362. Specification of Letters Patent. Patented Apr. 19, 1910.

No Drawing. Application filed June 25, 1909. Serial No. 504,273.

*To all whom it may concern:*

Be it known that we, JACOB A. SCHMITT and CHARLES R. BELL, citizens of the United States, residing at Chicago, in the county of Cook and State of Illinois, have invented certain new and useful Improvements in Composition of Matter, of which the following is a specification.

Our invention consists in the provision of a composition of matter which has the property of absorbing large quantities of water and having such an affinity for water that the surrounding atmosphere may be maintained thereby in a uniformly humid condition for a protracted period of time.

Our invention is especially applicable for the production of humidifiers for use to maintain the atmosphere in a moist or humid condition.

The composition consists of the following ingredients combined in substantially the proportions stated:

| | |
|---|---|
| Calcium oxid | .92 parts. |
| Silica | 18.63 " |
| Barium sulfate | 3.37 " |
| Chlorid of zinc | .24 " |
| Glycerin | 1.12 " |
| Aluminum | .60 " |
| Ferric oxid | .84 " |
| Gypsum | 29.32 " |
| Calcium carbonate | 9.37 " |
| Cotton floss | 2.63 " |
| Clay | 3.60 " |
| Magnesium | .78 " |
| Coloring matter | .36 " |
| Water | 28.22 " |

Many of the ingredients are found in their natural state in the clay and silica, and, therefore, reduced to its simplest state, the formula is substantially as follows:

| | |
|---|---|
| Clay | 29.83 parts. |
| Vegetable fiber | 2.63 " |
| Silica | 18.63 parts. |
| Gypsum | 29.32 " |
| Glycerin | 1.12 " |
| Chlorid of zinc | .24 " |
| Water | 18.23 " |

These ingredients are to be mixed thoroughly by agitation and kneading and then molded into suitable forms.

The clay and silica form the main porous body. The gypsum is the chemical binder and hardener and forms a considerable portion of the porous body after it has become set. The chlorid of zinc and glycerin have considerable affinity for water and tend to retain the water in the body part and prevent its too rapid evaporation by the surrounding atmosphere, so that the dispersion becomes more uniform. The cotton floss serves as a mechanical fibrous binder to hold the composition together. These are the essentials of the composition.

In use, the body is immersed in water, large quantities of which are absorbed or taken up by infiltration. Our composition may be molded into convenient form and used as a humidifier in receptacles containing cigars and the like for maintaining the contents uniformly damp.

What we claim is:

The herein described composition of matter consisting of clay, silica, a fibrous mechanical binder, a chemical binder, glycerin, and chlorid of zinc, substantially as and for the purpose specified.

In testimony whereof we hereunto set our hands.

JACOB A. SCHMITT.
CHARLES R. BELL.

In the presence of—
W. LINN ALLEN,
MARY F. ALLEN.